United States Patent
Lin et al.

(10) Patent No.: US 9,939,324 B2
(45) Date of Patent: *Apr. 10, 2018

(54) ENHANCED PIXEL FOR WAVEFRONT SENSING

(71) Applicant: Sensors Unlimited, Inc., Princeton, NJ (US)

(72) Inventors: Minlong Lin, Plainsboro, NJ (US); Joshua Lund, Dallas, TX (US); Patrick Kuschak, Brooklyn, NY (US)

(73) Assignee: Sensors Unlimited, Inc., Princeton, NJ (US)

( * ) Notice: Subject to any disclaimer, the term of this patent is extended or adjusted under 35 U.S.C. 154(b) by 114 days.

This patent is subject to a terminal disclaimer.

(21) Appl. No.: 14/997,159

(22) Filed: Jan. 15, 2016

(65) Prior Publication Data
US 2017/0208265 A1  Jul. 20, 2017

(51) Int. Cl.
*H04N 3/14* (2006.01)
*H04N 5/335* (2011.01)
*G01J 9/00* (2006.01)

(52) U.S. Cl.
CPC ..................... *G01J 9/00* (2013.01)

(58) Field of Classification Search
CPC ............ H04N 5/3745; H04N 5/37457; H04N 5/3741; H04N 5/3742; H04N 5/365; H01L 27/14609; H01L 27/14649; H01L 27/14643; H01L 27/14645

USPC ....... 348/166, 294, 300–302, 308; 250/208.1
See application file for complete search history.

(56) References Cited

U.S. PATENT DOCUMENTS

| | | | |
|---|---|---|---|
| 7,057,806 B2 | 6/2006 | Atkinson | |
| 7,586,074 B2 | 9/2009 | Gulbransen et al. | |
| 7,733,401 B2* | 6/2010 | Takeda | H04N 5/2353 250/208.1 |
| 8,258,451 B2 | 9/2012 | Vampola et al. | |
| 9,025,063 B2 | 5/2015 | Ahn et al. | |
| 9,698,182 B2 | 7/2017 | Lin et al. | |
| 2012/0261553 A1 | 10/2012 | Elkind et al. | |
| 2015/0009337 A1 | 1/2015 | Minlong | |
| 2016/0295146 A1* | 10/2016 | Lin | H04N 5/33 |
| 2017/0207262 A1* | 7/2017 | Lin | H01L 27/14643 |

* cited by examiner

*Primary Examiner* — Kelly L Jerabek
(74) *Attorney, Agent, or Firm* — Locke Lord LLP; Scott D. Wofsy; Judy R. Naamat

(57) ABSTRACT

A wavefront sensing pixel is provided. The wavefront sensing pixel includes a low-pass filter filtering a charge signal from a photodetector and outputting a control signal when low-frequency signals are detected in the charge signal, and a control device to control flow of the charge signal past the control device based on whether a low-frequency signal is detected in the charge signal. The wavefront sensing pixel further includes a low-frequency signal path that receives a flow of signals that flow past the control device, and a high-frequency signal path independent of the low-pass filter and the control device, the high-frequency signal path receiving high-frequency signals included in the charge signal.

22 Claims, 3 Drawing Sheets

ENHANCED PIXEL FOR WAVEFRONT SENSING

DEVELOPMENT

This invention was made with government support under contract number FA9451-15-D-0023 awarded by the United States Air Force. The government has certain rights in the invention.

BACKGROUND OF THE DISCLOSURE

1. Field of the Invention

The present disclosure relates to wavefront sensing, and more particularly to using wavefront sensing with an enhanced pixel.

2. Description of Related Art

Wavefront sensors are used to correct aberrations in images. For example, images generated during air travel can be subjected to turbulence that can cause the images to be laden with aberrations. Wavefront sensing can be applied to such aberration laden images to detect and remove aberrations and output an aberration-free image.

For example, a telescope can enlarge an image during air travel, including when turbulence occurs. The turbulence can add aberrations to the enlarged image. The enlarged image can be output to optics including one or more lenses that modify the enlarged image, such as to provide focus or change the size of the image. The optics can output the image to a detector having an array of imaging pixels that senses the image and generates a plurality of electrical signals, such as to form an analog image that represents the image output by the optics. The detector can include a wavefront sensing circuit that detects aberrations in the electrical signals that represent the sensed image, such as aberrations caused by the turbulence. A reconstruction module can use the detected aberrations to reconstruct the sensed image by correcting the detected aberrations and outputting an aberration-free image.

Wavefront sensing applications typically use pulsed laser illumination with pulse durations on the order of tens of nanoseconds. The wavefront sensing circuit must be able to sense these high-speed signals while imparting low noise. High speed and low noise are often conflicting parameters in a photodetector pixel design.

Wavefront sensing pixels that use capacitive transimpedance amplifier (CTIA) pixels take advantage of the high-speed nature of CTIA pixels. However, CTIA pixels are susceptible to noise due to magnification of amplifier noise at an output node. An integration capacitor positioned along a feedback path of an input buffer must have a very low capacitance due to noise considerations. The restriction on the size of the capacitance of the integration capacitor limits the intensity of the signal that can be sensed before saturation. Additionally, a CTIA pixel designed for high speed detection would have a high bandwidth and integrate noise over a wide range of frequencies, resulting in a tradeoff between noise performance and pixel speed.

While conventional methods and systems have generally been considered satisfactory for their intended purpose, there is still a need in the art for pixels to perform wavefront sensing with reduced noise and with increased sensitivity capable of sensing short-duration laser pulses. The present disclosure provides a solution for this problem.

SUMMARY OF THE INVENTION

The subject disclosure is directed to a new and useful wavefront sensing pixel. The wavefront sensing pixel includes a low-pass filter filtering a charge signal from a photodetector and outputting a control signal when low-frequency signals are detected in the charge signal, and a control device to control flow of the charge signal past the control device based on whether a low-frequency signal is detected in the charge signal. The wavefront sensing pixel further includes a low-frequency signal path that receives a flow of signals that flow past the control device, and a high-frequency signal path independent of the low-pass filter and the control device, the high-frequency signal path receiving high-frequency signals included in the charge signal.

In embodiments, the control device can be a direct injection transistor. The wavefront sensing pixel can further include a first-stage buffering device that receives and buffers the charge signal from the photodetector, wherein the output from the first-stage buffering device can be received by the low-pass filter and the high-frequency signal path. The low-pass filter can include a second-stage buffering device and a low-pass capacitor, wherein the second-stage buffering device can receive the output from the first-stage buffering device.

In embodiments, the control device can be a direct injection transistor, the second-stage buffer can be a feedback amplifier, output of the feedback amplifier can be applied to a gate of the direct injection transistor, and a terminal of the direct injection transistor can be coupled to the photodetector. The low-pass capacitor can be coupled to a node coupled to the output of the feedback amplifier and the gate of the direct injection transistor to control operation of the direct injection transistor. The wavefront sensing pixel can further include at least one low-frequency imaging device receiving signals that flow along the low-frequency signal path.

In embodiments, the wavefront sensing pixel can further include a high-pass filter that can filter output from the first-stage buffering device via the high-frequency signal path and output a high-frequency signal. The high-frequency signal can be processed for wavefront sensing.

In embodiments, the wavefront sensing pixel can further include a buffer that can receive the high-frequency signal from the high-pass filter. The buffer can be a source-follower to convert high input impedance of the high-frequency signal to low impedance. The wavefront sensing pixel can further include a switch circuit for controlling transmission of output from the at least one low-frequency imaging device and the high-frequency signal to a readout circuit. The switch circuit can include a first switch circuit that can control transmission of output from the at least one low-frequency imaging device to the readout circuit, and a second switch circuit that can control transmission of the high-frequency signal to the readout circuit.

In accordance with a further aspect of the disclosure, imaging device having a focal plane array that includes an imaging pixel array. The imaging pixel array can include an array of the enhanced imaging pixels.

In accordance with a further aspect of the disclosure, a method for outputting high-frequency signals from a buffered direct injection pixel is provided. The method includes filtering a charge signal from a photodetector, outputting a control signal when low-frequency signals are detected in the charge signal, controlling flow of the charge signal past the control device based on whether a low-frequency signal is detected in the charge signal, propagating signals that flow past the control device along a low-frequency signal path, and propagating, independent of the low-pass filter and the control device, signals included in the charge signal along a high-frequency signal path.

In embodiments, the method can include buffering the charge signal and outputting the buffered charge signal to the low-pass filter and the high-frequency signal path. The method can include filtering the buffered charge signal received by the high-frequency signal path and outputting a high-frequency signal.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
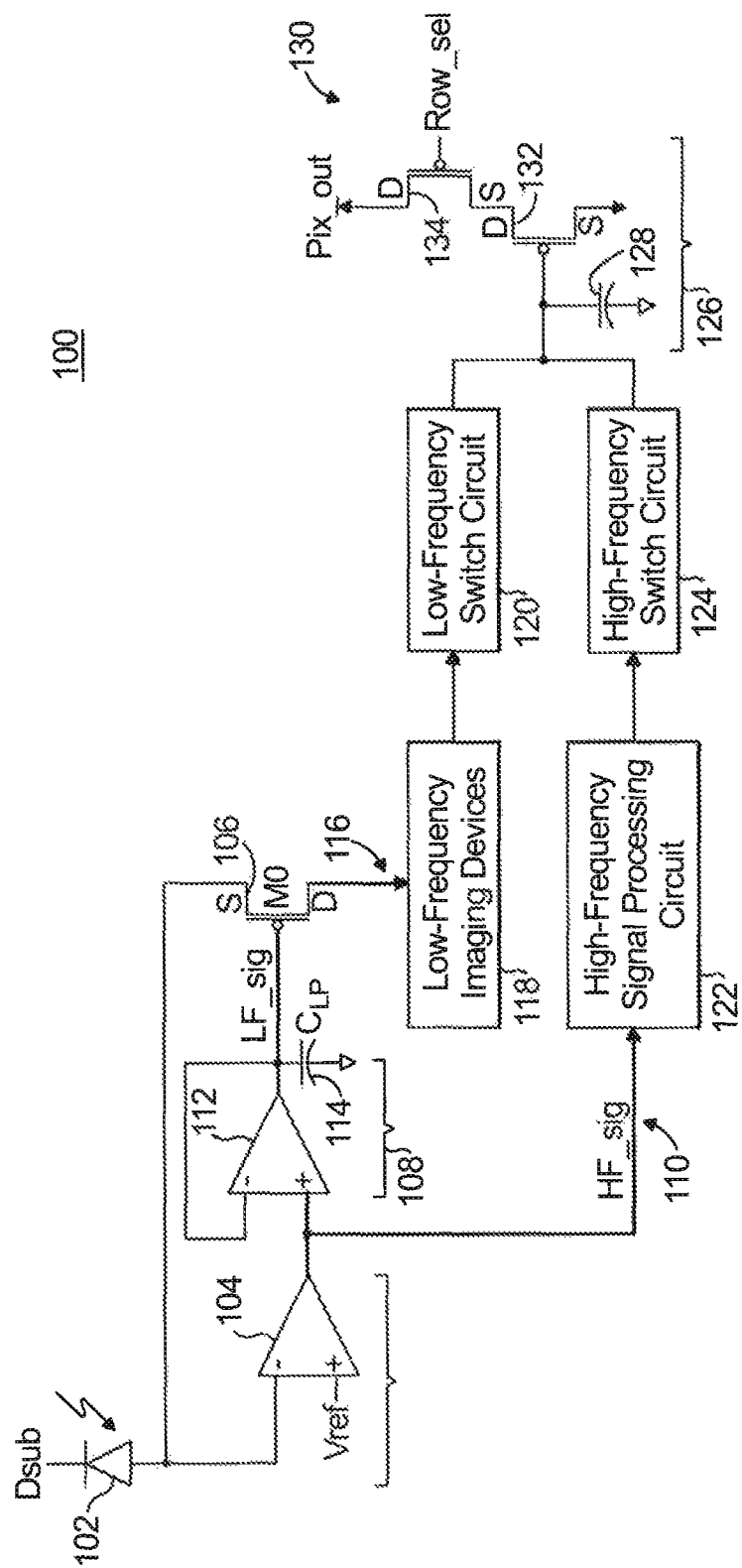
FIG. 1 shows a schematic diagram of an exemplary embodiment of an enhanced pixel for wavefront sensing in accordance with embodiments of the present disclosure.

Reference will now be made to the drawings wherein like reference numerals identify similar structural features or aspects of the subject disclosure. For purposes of explanation and illustration, and not limitation, a schematic diagram of an exemplary embodiment of an enhanced pixel for wavefront sensing in accordance with the disclosure is shown in FIG. 1 and is designated generally by reference character 100. Other embodiments of an enhanced pixel in accordance with the disclosure, or aspects thereof, are provided in FIGS. 2-5, as will be described.

An example enhanced pixel 100 for wavefront sensing is shown in FIG. 1. The enhanced pixel 100 includes a low-frequency signal path for lower-frequency signals and a high-frequency signal path for high-frequency signals that can be processed for wavefront sensing. The enhanced pixel 100 includes a photodetector 102 that transmits charge signals which are received by a first-stage buffer 104 and a control device 106. The first-stage buffer 104 buffers the charge signals and outputs a signal HF_sig that is received by a buffer/low-pass filter (LPF) 108 and high-frequency signal path 110. The buffer/LPF 108, which can include a feedback amplifier 112 and a low-pass capacitor $C_{LP}$ 114, outputs a signal LF_sig. The control device 106, as described further below, receives a charge signal from the photodetector 102, and controls flow of the charge signal to a low-frequency signal path 116 based on LF_sig.

Signals propagating along the LF signal path 116 are received by LF imaging devices 118, which transmits output to a first switch circuit 120. Signals propagating along the HF signal path 110 are received by HF signal processing circuit 122, which transmits output to a second switch circuit 124. Output from the first and second switch circuits 120, 124 is provided to a signal readout circuit 126. Signal readout circuit 126 includes a storage device 128 (e.g., a capacitor) and a row selection circuit 130 having transistors 132 and 134. Transistors 132 and 134 can be MOSFET devices, and are shown in the example embodiment as PMOS devices. A gate of transistor 132 is coupled to a node that couples to the output from the first and second switch circuits 120 and 124 and to storage device 128. Output signals Pix_out are output in response to a Row_sel signal applied to a gate of transistor 134.

The photodetector 102 can detect an excitation signal, such as photons from a source of IR radiation light or a laser. The photodetector 102 converts the excitation signal into an electrical charge signal.

The first-stage buffer 104, which is shown in the example embodiment as an operational amplifier, also receives the charge signal output by the photodetector 102 at its negative input terminal (the input node). A reference voltage Vref is provided to the positive input terminal (reference node) of the first-stage buffer 104. The output from the first-stage buffer 104 is provided to the high-frequency signal path 110 and a positive input terminal of the feedback amplifier 112. The first-stage buffer 104 isolates the photodetector 102 from the load of the high-frequency signal processing circuit 122 and amplifies the signal from the photodetector 102. The high-frequency signal processing circuit 122 includes a high-pass filter that is tuned to pass the high-frequency target signal and attenuate noise with lower frequency content, which increases the signal-to-noise ratio and the sensitivity of the pixel 100 to high-frequency inputs.

The feedback amplifier 112 functions as a second-stage buffer. The feedback amplifier 112 can be an operational amplifier having an open-loop gain. Output of the feedback amplifier 112 is provided as feedback to a negative input terminal of the feedback amplifier 112. The output of the feedback amplifier 112 is further coupled to the low-pass capacitor 114 and provided to a gate of the control device 106 as the control signal LF_sig. The low-pass capacitor 114 is a delay element. The time required to charge or discharge the low-pass capacitor 114 causes a time delay when LF_sig changes, and biases the control device 106 to pass only low frequency signals, leaving high frequency signal charge to accumulate on the detector.

More specifically, the input impedance of the control device 106 controls which path, the low-frequency signal path 116 or the high-frequency signal path 110, that charge signals output by photodetector 102 follow. Initially, as impedance of the control device 106 increases, almost all signal charges drift to the input node of the first-stage buffer 104, which exit the first-stage buffer 104 as HF_sig via the high-frequency signal path 110. As time elapses, all charge signals from the photodetector 102, including low-frequency and high-frequency signals, pass through the control device 106, entering the control device's 106 source node and exiting its drain node, and enter the low-frequency signal path 116 for processing by the low-frequency imaging devices 118. The feedback amplifier 112 together with the low-pass capacitor 114 form the buffer/LPF 108, which allows only low-frequency signals to be output as LF_sig. The buffer/LPF 108 thus filters the charge signal from the photodetector 102 and outputs LF_sig that operates as a control signal to set the control device 106 to lower impedance when low-frequency signals are detected in the charge signal and to set the control device 106 to higher impedance temporarily when only high-frequency signals are present. After a transient charge surging period, any charges from photodiode 102, either low-frequency or high-frequency, will gradually and completely drift through control device 106 as the feedback circuit eventually restores the voltage at the negative terminal of the first-stage buffer 104 to equal the voltage at its positive terminal, Vref.

The control device 106 can include a direct injection transistor that receives the charge signal from the photodetector 102. In the example embodiment shown, the direct injection transistor is a p-type MOSFET otherwise referred to as a PMOS transistor. The control device 106 receives the charge from the photodetector 102 at its source node. The charge can only flow through the control device 106 and exit from its gate node to the low-frequency signal path when the control device 106 is switched on.

When the control device 106 is switched on, it controls flow of the charge signal through the control device 106 to the low-frequency signal path 116. When the control device 106 is switched off, it does not allow any charge signal to flow to the low-frequency signal path 116. Thus, the control device 106 controls flow of the charge signal past the control device 106 based on whether a low-frequency signal is detected in the charge signal.

The low-pass capacitor 114 can be coupled to a node that is coupled to the output of the feedback amplifier 112 and the gate of the direct injection transistor of the control device 106. In this configuration, the low-pass capacitor 114 controls operation of the direct injection transistor of the control device 106. The low-pass capacitor and the feedback amplifier 112 establish a cutoff frequency that sets a frequency boundary between the high-frequency path 110 and the low-frequency signal path 116. Input signals below this cutoff frequency will be directed through the control device 106 to the low-frequency signal path 116.

The charge that is allowed to flow past the control device 106 to the low-frequency signal path 116 is received by at least one low-frequency imaging device 118. The low-frequency imaging device 118 may be any circuit that integrates signal charge to generate an output voltage level. In its most basic implementation, the low-frequency imaging device 118 could be a capacitor. Output from the low-frequency imaging device 118 is provided to a low frequency switch circuit 120 that controls transmission of the output from the low-frequency imaging device 118 to the readout circuit 126.

HF_sig, which is propagated along the high-frequency signal path 110, includes the buffered charge output from the first-stage buffer 104. This buffered charge includes high and low-frequency signals that correspond to the charge output by the photodetector 102. The high-frequency signals can travel along the high-frequency signal path 110 or the low-frequency signal path 116. However, the high-frequency signals that flow along the low-frequency path 116 are delayed relative to the high-frequency signals that flow along the high-frequency signal path 110 due to the delayed route through the control device 106, as controlled by the low-pass capacitor 114 and the feedback amplifier 112.

Figure 2:
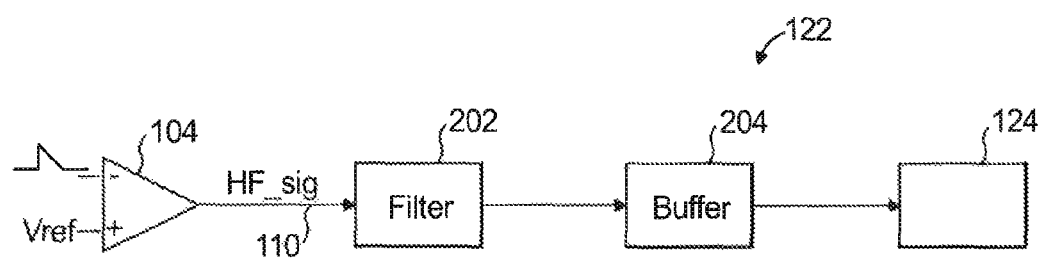
FIG. 2 shows a block diagram of the high-frequency signal processing circuit receiving HF_sig from a first-stage buffer.

FIG. 2 shows a block diagram of an example embodiment of the high-frequency signal processing circuit 122. The high-frequency signal processing circuit 122 includes a filter 202 that receives HF_sig from the first-stage buffer 104 via high-frequency signal path 110. The output of the filter 202 is provided to a buffer 204. The output of the buffer 204 is provided to the second switch circuit 124.

Figure 3:
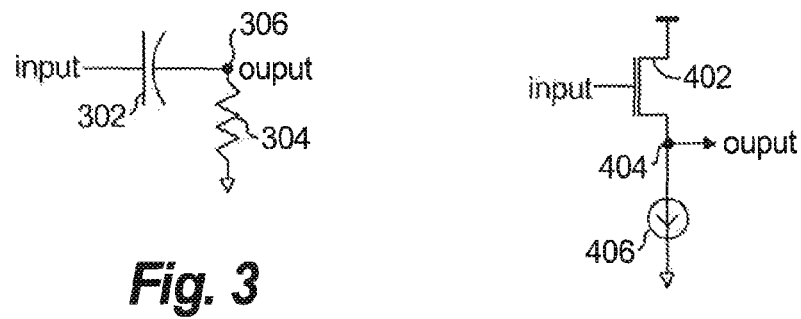
FIG. 3 is a schematic diagram of a filter shown in the high-frequency signal processing circuit of FIG. 2.

FIG. 3 shows a schematic diagram of an example embodiment of filter 202. The filter 202 can be a high-pass filter that allows only high-frequency signals of HF_sig to be passed to the buffer 204. The filter 202 can be, for example, an RC filter having a capacitor 302 and a resistor 304. Input to the RC-filter can be received at capacitor 302. A node 306 coupled to the capacitor can be coupled to resistor 304. The output of the RC filter can be provided from node 306 to the buffer 204.

Figure 4:
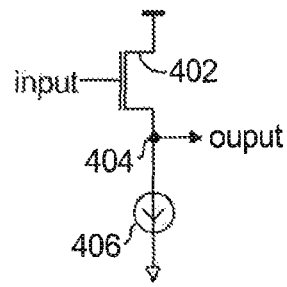
FIG. 4 is a schematic diagram of a buffer shown in the high-frequency signal processing circuit of FIG. 2.

FIG. 4 shows a schematic diagram of an example embodiment of buffer 204. The buffer 204 can be a source follower that converts high input impedance to low output impedance. The input can be received at a transistor 402. A node 404 coupled to the transistor can be coupled to a current source 406 (e.g., a transistor). The output from the buffer 204 can be provided from node 404 to the second switch circuit 124.

The first and second switch circuits 120 and 124 form a multiplexer to multiplex both low-frequency and high-frequency signals to the input of a single readout circuit 126. The low-frequency switch circuit 122 controls output from the low-frequency imaging devices 118 to the readout circuit 126, and the high-frequency switch circuit 124 controls output from the high-frequency signal processing circuit 122 to the readout circuit 126. In particular, the first and second switch circuits 122 and 124 provide this control in order that the output from the high-frequency signal processing circuit 122 is processed for wavefront sensing, e.g., by a circuit (not shown) that performs wavefront sensing. On the other hand, the output from the low-frequency imaging devices 118 is not provided for wavefront sensing, but is rather output to a suitable circuit (not shown), such as for generalized video image processing.

In accordance with an embodiment, an example method is provided for buffering a charge signal from a photodetector and outputting the buffered charge signal to a low-pass filter and a high-frequency signal path. The filtering by the low-pass filter can include outputting a control signal that indicates when low-frequency signals are detected in the charge signal and controlling flow of the charge signal past the control device based on whether a low-frequency signal is detected in the charge signal. In addition, the method can include propagating signals that flow past the control device along a low-frequency signal path. Further, the method can include propagating, independent of the low-pass filter and the control device, signals included in the charge signal along a high-frequency signal path. In addition, the method can include filtering the buffered charge signal received by the high-frequency signal path and outputting a high-frequency signal. The high-frequency signal can then be provided for additional processing suitable for high-frequency signals, such as wavefront sensing.

Figure 5:
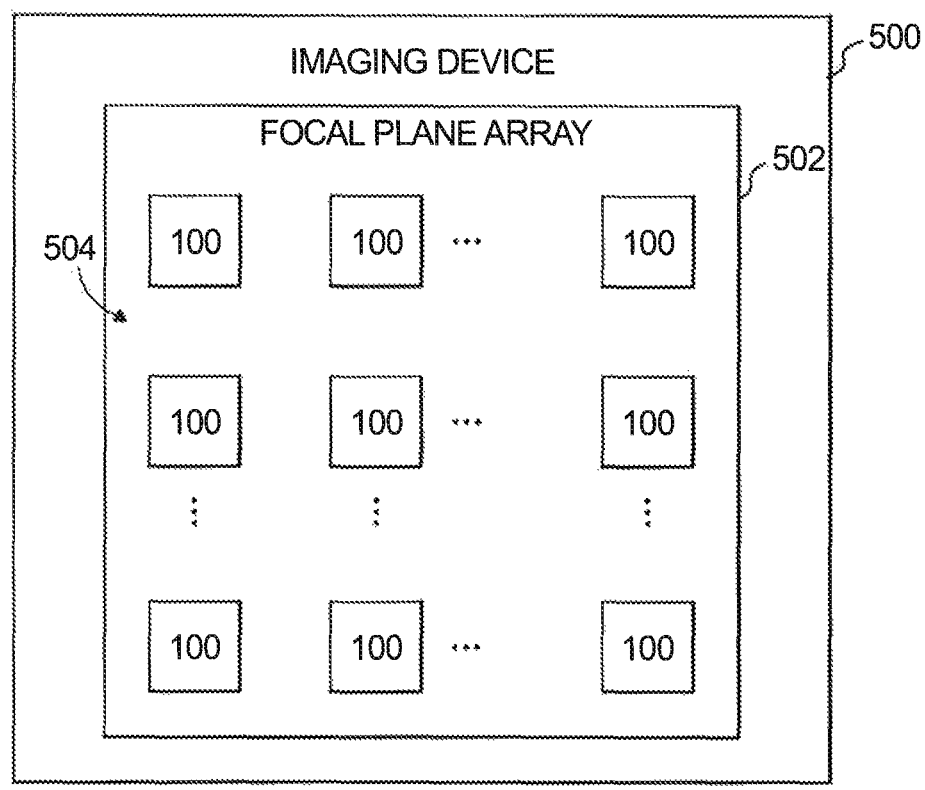
FIG. 5 is a block diagram of an imaging device that includes an array of the enhanced pixels shown in FIG. 1.

With reference now to FIG. 5, an imaging device 500 is illustrated that includes a focal plane array 502 (e.g., a readout integrated circuit (ROIC)) have an array of enhanced pixels 100 arranged on a substrate 504. The imaging device 500 can further include optics, row and column drivers, decoders, signal processing circuits, and image processing circuits (not shown). Further, the imaging device 500 can include one or more processing devices (not shown) that execute stored programmable instructions to control and/or perform functions of the imaging device 500.

The methods and systems of the present disclosure, as described above and shown in the drawings, provide for providing high-frequency signals that are a high-frequency component of photodetector charge output with superior properties including low-noise and substantial instantaneous output following charge generation. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A wavefront sensing pixel comprising:
    a low-pass filter filtering a charge signal from a photodetector and outputting a control signal when low-frequency signals are detected in the charge signal;
    a control device to control flow of the charge signal past the control device based on whether a low-frequency signal is detected in the charge signal;

a low-frequency signal path that receives a flow of signals that flow past the control device; and a high-frequency signal path independent of the low-pass filter and the control device, the high-frequency signal path receiving high-frequency signals included in the charge signal.

2. The wavefront sensing pixel of claim 1, wherein the control device is a direct injection transistor.

3. The wavefront sensing pixel of claim 1, further comprising a first-stage buffering device that receives and buffers the charge signal from the photodetector, the output from the first-stage buffering device being received by the low-pass filter and the high-frequency signal path.

4. The wavefront sensing pixel of claim 3, wherein the low-pass filter includes a second-stage buffering device and a low-pass capacitor, the second-stage buffering device receiving the output from the first-stage buffering device.

5. The wavefront sensing pixel of claim 4, wherein the control device is a direct injection transistor, the second-stage buffer is a feedback amplifier, output of the feedback amplifier is applied to a gate of the direct injection transistor, and a terminal of the direct injection transistor is coupled to the photodetector.

6. The wavefront sensing pixel of claim 5, wherein the low-pass capacitor is coupled to a node coupled to the output of the feedback amplifier and the gate of the direct injection transistor to control operation of the direct injection transistor.

7. The wavefront sensing pixel of claim 3, further comprising a high-pass filter filtering output from the first-stage buffering device via the high-frequency signal path and outputting a high-frequency signal.

8. The wavefront sensing pixel of claim 7, further comprising a buffer receiving the high-frequency signal from the high-pass filter.

9. The wavefront sensing pixel of claim 8, wherein the buffer is at least one of a source-follower and impedance converter to convert high input impedance of the high-frequency signal to low impedance.

10. The wavefront sensing pixel of claim 1, further comprising at least one low-frequency imaging device receiving signals that flow along the low-frequency signal path.

11. The wavefront sensing pixel of claim 10, further comprising a switch circuit for controlling transmission of output from the at least one low-frequency imaging device and the high-frequency signal to a readout circuit.

12. The wavefront sensing pixel of claim 11, wherein the switch circuit includes a first switch circuit that controls transmission of output from the at least one low-frequency imaging device to the readout circuit and a second switch circuit that controls transmission of the high-frequency signal to the readout circuit.

13. The wavefront sensing pixel of claim 1, wherein the high-frequency signal is processed for wavefront sensing.

14. An imaging device having a focal plane array that includes an imaging pixel array, the imaging pixel array comprising:

a plurality of imaging pixels, the imaging pixels comprising:

a low-pass filter filtering a charge signal from a photodetector and outputting a control signal when low-frequency signals are detected in the charge signal;

a control device to control flow of the charge signal past the control device based on whether a low-frequency signal is detected in the charge signal;

a low-frequency signal path that receives a flow of signals that flow past the control device; and a high-frequency signal path independent of the low-pass filter and the control device, the high-frequency signal path receiving high-frequency signals included in the charge signal.

15. The imaging device of claim 14, wherein the control device is a direct injection transistor.

16. The imaging device of claim 14, further comprising a first-stage buffering device that receives and buffers the charge signal from the photodetector, the output from the first-stage buffering device being received by the low-pass filter and the high-frequency signal path.

17. The imaging device of claim 16, wherein the low-pass filter includes a second-stage buffering device and a low-pass capacitor, the second-stage buffering device receiving the output from the first-stage buffering device.

18. The imaging device of claim 16, further comprising a high-pass filter filtering output from the first-stage buffering device via the high-frequency signal path and outputting a high-frequency signal.

19. The imaging device of claim 14, wherein the high-frequency signal is processed for wavefront sensing.

20. A method for outputting high-frequency signals from a buffered direct injection pixel, the method comprising:

filtering a charge signal from a photodetector;

outputting a control signal when low-frequency signals are detected in the charge signal;

controlling flow of the charge signal past a position at which controlling the flow occurs based on whether a low-frequency signal is detected in the charge signal;

propagating signals along a low-frequency signal path that flow past the position at which controlling the flow occurs; and propagating signals included in the charge signal along a high-frequency signal path that is independent of a position at which the filtering occurs and a position at which the controlling the flow occur.

21. The method of claim 20 further comprising:

buffering the charge signal; and outputting the buffered charge signal to the position at which the filtering occurs and the high-frequency signal path.

22. The method of claim 21 further comprising:

filtering the buffered charge signal received by the high-frequency signal path; and outputting a high-frequency signal.

* * * * *